US008532458B2

(12) United States Patent
Jung et al.

(10) Patent No.: US 8,532,458 B2
(45) Date of Patent: Sep. 10, 2013

(54) PICTURE SEARCH METHOD AND APPARATUS FOR DIGITAL REPRODUCTION

(75) Inventors: Choon-sik Jung, Suwon-si (KR); Cheul-hee Hamn, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 708 days.

(21) Appl. No.: 11/174,460

(22) Filed: Jul. 6, 2005

(65) Prior Publication Data

US 2006/0013560 A1 Jan. 19, 2006

(30) Foreign Application Priority Data

Jul. 15, 2004 (KR) .................. 10-2004-0055093

(51) Int. Cl.
*H04N 5/765* (2006.01)
*H04N 5/931* (2006.01)

(52) U.S. Cl.
USPC ......................................... 386/200; 386/204

(58) Field of Classification Search
USPC ............................................................ 386/46
See application file for complete search history.

(56) References Cited

U.S. PATENT DOCUMENTS

| 5,943,054 | A | * | 8/1999 | Hirano et al. ................. 715/827 |
| 5,970,205 | A | * | 10/1999 | Nakamura et al. ............. 386/68 |
| 6,026,389 | A | | 2/2000 | Nakajima et al. |
| 6,321,024 | B1 | | 11/2001 | Fujita et al. |
| 6,925,602 | B1 | * | 8/2005 | Clapper ........................ 715/723 |
| 7,907,204 | B2 | * | 3/2011 | Kudo ........................ 348/333.03 |
| 2002/0133486 | A1 | | 9/2002 | Yanagihara et al. |
| 2003/0108338 | A1 | * | 6/2003 | Nonomura et al. ............. 386/95 |
| 2003/0123853 | A1 | * | 7/2003 | Iwahara et al. ................. 386/69 |
| 2005/0002645 | A1 | * | 1/2005 | Furukawa et al. ............. 386/68 |

FOREIGN PATENT DOCUMENTS

| JP | 7-240899 | 9/1995 |
| JP | 7-298267 | 11/1995 |
| JP | 9-107517 | 4/1997 |
| JP | 10-066008 | 3/1998 |
| JP | 11-146325 | 5/1999 |
| JP | 11-155129 | 6/1999 |
| JP | 2001-143448 | 5/2001 |
| JP | 2002-77820 | 3/2002 |
| JP | 2002-281433 | 9/2002 |

(Continued)

OTHER PUBLICATIONS

Office Action dated Jan. 9, 2006 of Korean Patent Application No. 10-2004-0055093 which corresponds to the above U.S. application and Notice to Submit Response, English translation.

(Continued)

*Primary Examiner* — William C Vaughn, Jr.
*Assistant Examiner* — Oluwaseun A Adegeye
(74) *Attorney, Agent, or Firm* — Staas & Halsey LLP

(57) ABSTRACT

A picture search method and apparatus for digital reproduction are provided. The picture search method includes, generating a multiple image screen by configuring one or more pictures provided before a reproduction start time selected by a user during a high-speed search to a screen or a plurality of screens, outputting the multiple image screen, and sequentially reproducing following pictures starting from a picture selected by the user among one or more pictures included in the output multiple image screen. Therefore, it is possible to allow a user to exactly select a desired reproduction start time during the high-speed search.

9 Claims, 9 Drawing Sheets

(56) References Cited

FOREIGN PATENT DOCUMENTS

| | | |
|---|---|---|
| JP | 2004-513589 | 4/2004 |
| JP | 2004-159082 | 6/2004 |
| JP | 2005-045620 | 2/2005 |
| KR | 1996-0019166 | 6/1996 |
| KR | 1998-4503 | 3/1998 |
| KR | 2000-0002691 | 1/2000 |
| WO | 02/39450 A2 | 5/2002 |

OTHER PUBLICATIONS

Japanese Office Action issued Sep. 28, 2010 in corresponding Japanese Patent Application 2005-204667.
Japanese Office Action for corresponding Japanese Patent Application No. 2005-204667 dated Aug. 23, 2011.
Japanese Office Action issued Aug. 7, 2012 in corresponding Japanese Patent Application 2005-204667.
Japanese Official Questioning dated Apr. 16, 2013 in corresponding Japanese Patent Application 2005-204667.

* cited by examiner

PICTURE SEARCH METHOD AND APPARATUS FOR DIGITAL REPRODUCTION

CROSS-REFERENCE TO RELATED APPLICATION

This application claims the benefit of Korean Patent Application No. 10-2004-0055093, filed on Jul. 15, 2004, in the Korean Intellectual Property Office, the disclosure of which is incorporated herein in its entirety by reference.

BACKGROUND OF THE INVENTION

1. Field of the Invention

The present invention relates generally to a picture search method and apparatus for digital reproduction. More particularly, embodiments of the present invention relate to a picture search method and apparatus enabling a user to find an exact reproduction start time.

2. Description of the Related Art

Digital reproducers/recorders using various storage mediums such as a HDD, a DVD, or a Blu-ray Disc are today widely used. The digital reproducer/recorder provides general recording and reproducing functions and additional services, such as high-speed forward reproduction, high-speed reverse reproduction, low-speed forward reproduction, and low-speed reverse reproduction.

FIG. 1 is a block diagram schematically showing a conventional digital reproduction system. Referring to FIG. 1, the conventional digital reproduction system includes a storage unit 110 for storing programs, a media interface 120 for connecting the storage unit 110 with a stream decoder, a stream decoder 130 for receiving a stream of the stored programs from the media interface 120 to demultiplex the stream into a plurality of programs, an audio decoder 140 for decoding an audio stream received from the stream decoder 130, a video decoder 150 for decoding a video stream received from the stream decoder 130, a display unit 160 for displaying a video picture on a screen, and a controller 170 for controlling respective components of the digital reproduction system.

The digital reproduction system performs a reproducing process as follows. First, a stream of a program (program stream) selected by a user among the programs stored in the storage unit 110 is transmitted from the storage unit 110 to the stream decoder 130 via the media interface 120. The stream decoder 130 converts the program stream into a video Elementary Stream (ES) and outputs the video ES to the video decoder 150. The video decoder 150 decodes only reference pictures included in the received video ES and transfers the decoded results to the display unit 160. The display unit 160 reproduces the reference pictures.

The digital reproduction system may perform reproduction at a reproduction speed faster than a normal reproduction speed. The display unit 160 displays pictures while skipping some pictures according to a predetermined reproduction speed without displaying all pictures to be shown at a normal reproduction speed. If a user manipulates buttons to select desired pictures while seeing a screen during high-speed forward (or reverse) reproduction, the user may not see the desired pictures due to delay, etc. caused by a time difference between the time when the user presses the buttons and a response time of the reproduction system. Particularly, the user has more difficulty in exactly finding a desired reproduction start time at a high reproduction speed due to the lower number of pictures between reference pictures.

SUMMARY OF THE INVENTION

An aspect of the present invention provides a picture search method and apparatus allowing a user to exactly select a desired reproduction start time during high-speed search.

According to an aspect of the present invention, there is provided a picture search method for digital reproduction, comprising: generating a multiple image screen by configuring one or more pictures provided before a reproduction start time selected by a user during a high-speed search to a screen or a plurality of screens; outputting the multiple image screen; and sequentially reproducing following pictures starting from a picture selected by the user among one or more pictures included in the multiple image screen.

The generating of the multiple image screen may comprise reducing sizes of the one or more pictures and arranging the size reduced pictures on the multiple image screen.

The generating of the multiple image screen may comprise hierarchically constructing the multiple image screen by including pictures at longer time intervals between one another in an upper layer and including adjacent pictures of each picture included in the upper layer in a lower layer.

The outputting of the multiple image screen may comprise: outputting the pictures included in the upper layer and outputting pictures included in a lower layer of a picture selected by the user among the output pictures.

The high-speed search may comprise a high-speed forward search or a high-speed reverse search.

The picture search method may further comprise: storing setting information, which is used to generate the multiple image screen, including at least one of information for the number of multiple image screens, information for the number of pictures included in a multiple image screen and information as to whether or not to hierarchically construct the multiple image screen.

According to another aspect of the present invention, there is provided a picture search apparatus for digital reproduction, comprising: a multiple image screen generator generating a multiple image screen by configuring one or more pictures provided before a reproduction start time selected by a user during a high-speed search to a screen or a plurality of screens and outputting the multiple image screen to a display unit; and a reproduction controller operating to sequentially reproduce following pictures starting from a picture selected by the user among one or more pictures included in the multiple image screen output to the display unit.

The multiple image screen generator may reduce sizes of the one or more pictures and arranges the size reduced pictures on the multiple image screen.

The multiple image screen generator may hierarchically configure the multiple image screen by including pictures with longer time intervals between each other in an upper layer and including adjacent pictures of each picture included in the upper layer in a lower layer.

The multiple image screen generator may first output the pictures included in the upper layer and outputs pictures included in a lower layer of a picture selected by the user among the output pictures.

The high-speed search may include high-speed forward search and high-speed reverse search.

The picture search apparatus may further comprise a high-speed search information setting unit for storing setting information, which is used to generate the multiple image screen, including information for the number of multiple image screens, information for the number of pictures included in a multiple image screen, and information as to whether or not to hierarchically construct the multiple image screen.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
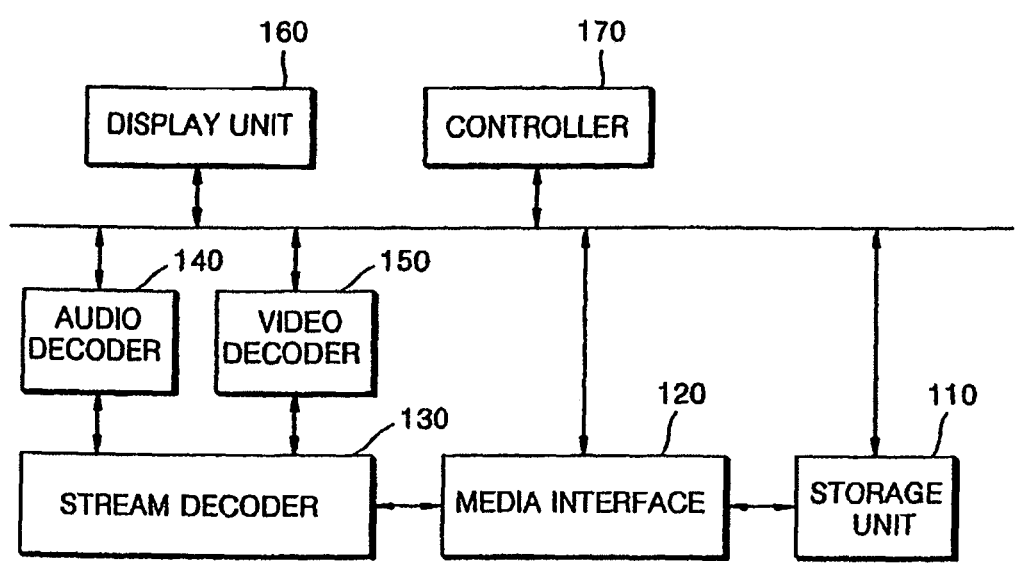
FIG. 1 is a block diagram schematically showing a conventional digital reproduction system.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
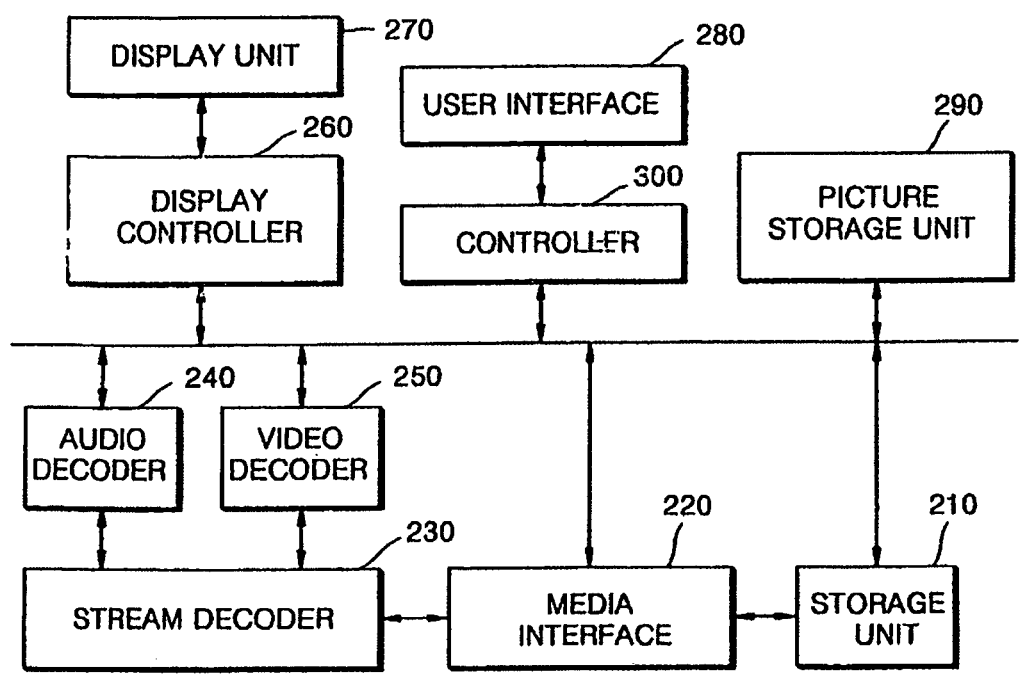
FIG. 2 is a block diagram schematically showing a digital reproduction system according to an embodiment of the present invention.

FIG. 2 is a block diagram schematically showing a digital reproduction system according to an embodiment of the present invention.

Referring to FIG. 2, the digital reproduction system includes a storage unit 210, a media interface 220, a stream decoder 230, an audio decoder 240, a video decoder 250, a display controller 260, a display unit 270, a controller 300, a user interface 280 and a picture storage unit 290.

The storage unit 210, which could be a disk (or a hard disk) such as a DVD or a BD, stores programs to be reproduced according to an embodiment of the present invention.

The media interface 220 is a device for connecting the stream decoder 230 with the storage unit 210 to read or write streams of the programs or related information stored in the storage unit 210. The media interface 220 may be an ATA (Advanced Technology Attachment) or an ATAPI (Advanced Technology Attachment Packet Interface).

The controller 300 controls respective components of the digital reproduction system, that is, the stream decoder 230, the audio decoder 240, the video decoder 250, the media interface 220, etc., in response to reproduction-related commands received through the user interface 280. Particularly, the controller 300 operates such that a plurality of frame pictures are displayed on a screen or on a predetermined number of screens before the frame pictures are normally reproduced after a high-speed search, to allow a user to exactly select a picture corresponding to his/her desired reproduction start time during high-speed forward/backward reproduction, thereby sequentially reproducing following pictures starting from the selected picture.

The stream decoder 230 decodes program streams received from the storage unit 210 via the media interface 220, and outputs the decoded results as an audio ES to the audio decoder 240, and as a video ES to the video decoder 250, respectively. The audio decoder 240 decodes the audio ES received from the steam decoder 230.

The video decoder 250 decodes the video ES received from the stream decoder 230. During normal reproduction, a picture decoded by the video decoder 250 is provided to the display controller 260 and displayed. However, during high-speed reproduction, the picture decoded by the video decoder 250 is provided to the display controller 260, after being subjected to a process such as size reduction and then stored in the picture storage unit 290.

The display controller 260 performs a control operation for displaying the picture received from the video decoder 250 on the display unit 270. During a high-speed search or reproduction operation, only a picture is displayed on a screen, while, when a screen for selecting a reproduction start time after high-speed search is provided, a plurality of pictures can be displayed on a screen.

The display unit 270 displays a screen provided by the display controller 260.

The user interface 280 receives a reproduction-related command from a user and transfers the received command to the controller 300. The user interface 280 may be a remote controller, a front panel, or a key pad.

The picture storage unit 290 is a memory for storing screen pictures processed by the display controller 260.

Figure 3:
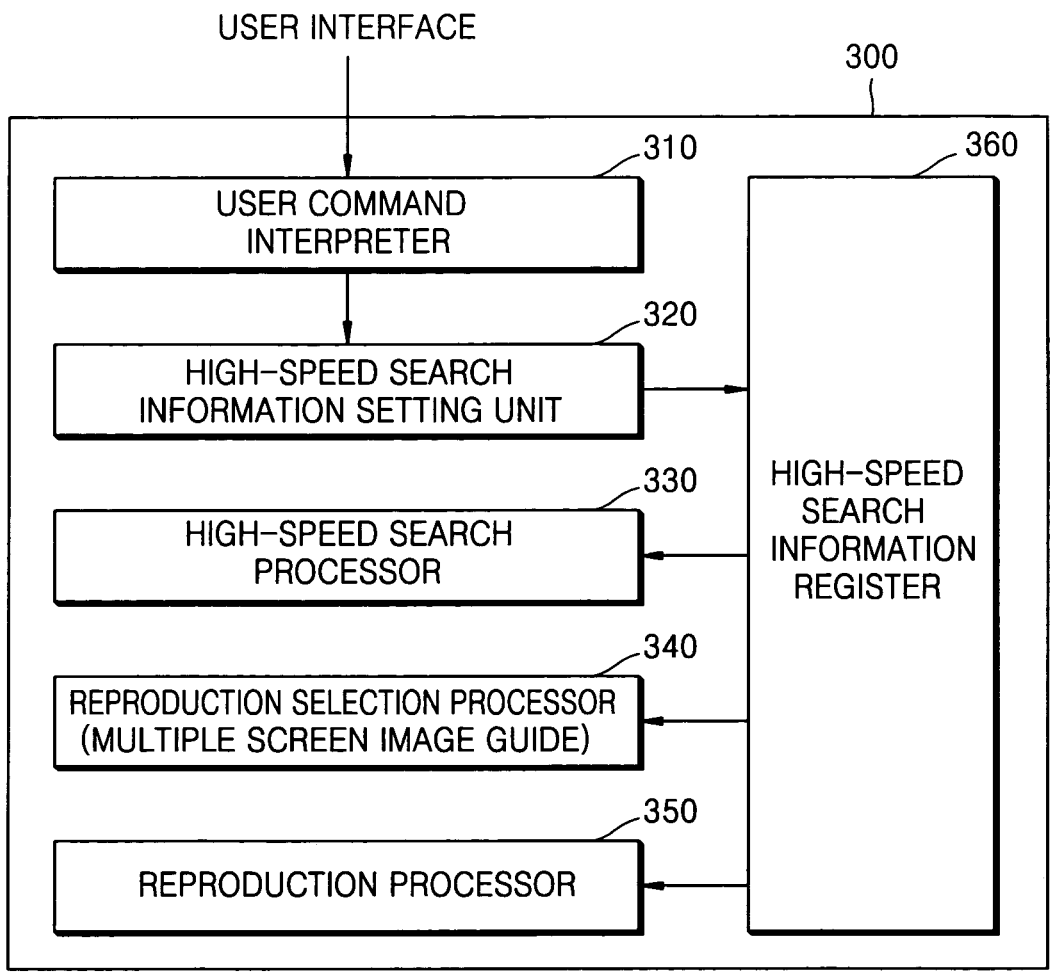
FIG. 3 is a block diagram of the controller shown in FIG. 2.

FIG. 3 is a block diagram of the controller 300 shown in FIG. 2. In FIG. 3, only components for processing reproduction-related operations when a picture search method according to an embodiment of the present invention is performed are shown.

Referring to FIG. 3, the controller 300 includes an user command interpreter 310, a high-speed search information setting unit 320, a high-speed search processor 330, a reproduction selection processor 340, a reproduction processor 350 and a high-speed search information register 360.

The user command interpreter 310 receives a reproduction-related command from a user through the user interface 280 and interprets the reproduction-related command. Then, the user command interpreter 310 sends control signals and related data to corresponding components to execute the reproduction-related command. That is, if the user command interpreter 310 receives a user command for storing setting information related to the configuration of a screen to be shown to a user to select a reproduction start time after a high-speed search, through the user interface 280, the user command interpreter 310 interprets the user command and transfers the interpreted result to the high-speed search information setting unit 320. If the user command interpreter 310 receives a high-speed search command through the user interface 280, the user command interpreter 310 interprets the high-speed search command and transfers the interpreted result to the high-speed search processor 330. If the user command interpreter 310 receives a reproduction selection command through the user interface 280, the user command interpreter 310 interprets the reproduction selection command and transfers the interpreted result to the reproduction selection processor 340. Also, if the user command interpreter 310 receives a reproduction command through the user interface 280, the user command interpreter 310 interprets the reproduction command and transfers the interpreted result to the reproduction processor 350.

Figure 5:
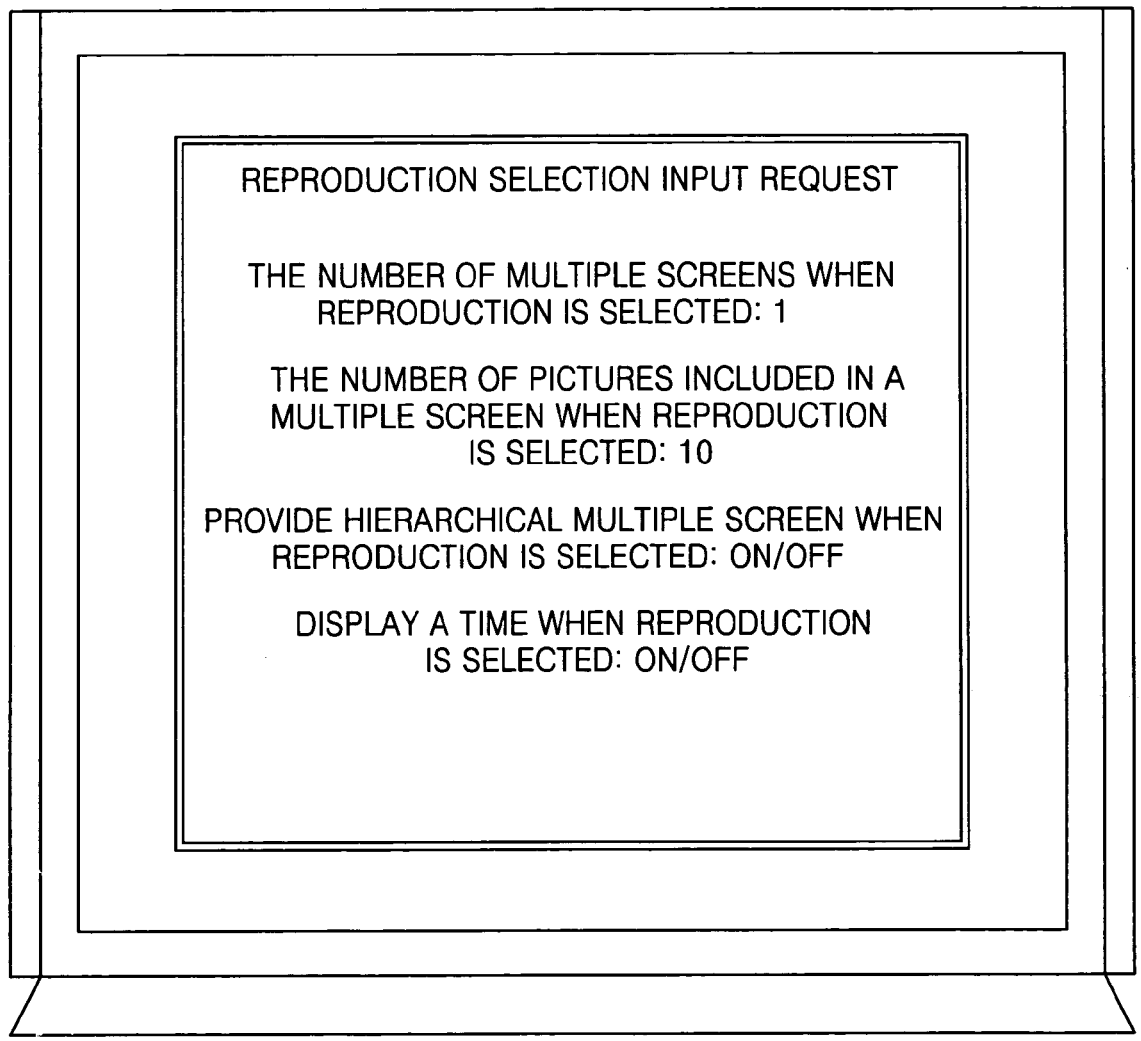
FIG. 5 is a schematic representation of a user interface through which a user inputs a reproduction selection command, according to an embodiment of the present invention.

The high-speed search information setting unit 320 stores setting information related to the configuration of a screen to be shown to the user to select a reproduction start time after the high-speed search. If a user selects a setting information menu for selecting a reproduction start time after the high-speed search through the user interface 280, the high-speed search information setting unit 320 controls the display unit 270 to display a menu screen as shown in FIG. 5. If the user inputs setting values to an input window of the menu screen, the user interface 280 receives and transmits the setting values to the user command interpreter 310. Then, the user command interpreter 310 transfers the setting values to the high-speed search information setting unit 320. The high-speed search information setting unit 320 stores the received setting values in the high-speed search information register 360.

The setting values stored in the high-speed search information register 360 include the number of multiple image screens when reproduction is selected, the number of pictures included in a multiple image screen when reproduction is selected, information as to whether or not to provide a hierarchical multiple image screen when reproduction is selected, information as to whether or not to display a time when reproduction is selected, etc., as shown in FIG. 5.

The number of multiple image screens when reproduction is selected represents the number of screens to be shown to a user to select a reproduction start time after high-speed search. If the number of multiple image screens is set to 1, all pictures in a predetermined time to be shown to a user to select a reproduction start time after high-speed search is displayed on a screen. If the number of multiple image screens is set to 3, pictures in a predetermined time to be shown to the user to select a reproduction start time after high-speed search are divided and displayed on three screens.

The number of pictures included in a multiple image screen when reproduction is selected represents the number of pictures to be displayed on a screen to be shown to a user to select a reproduction start time after high-speed search.

The information as to whether or not to provide a hierarchical multiple image screen when reproduction is selected, means information as to whether or not to hierarchically construct a screen to be shown to a user to select a reproduction start time after high-speed search. Hierarchically constructing screens means to first display pictures at longer time intervals between each other on a first screen shown to a user to select a reproduction start time after high-speed search and when the user selects one of the pictures displayed on the first screen, display adjacent pictures of the selected picture on the following screen. Since users have a high probability of failing to select a desired reproduction start time at a high reproduction speed at which screens pass fast, hierarchical constructing screens is effective at the high reproduction speed.

The information as to whether or not to display a time when reproduction is selected, means information as to whether or not to display a time on a screen to be shown to the user to select a reproduction start time after high-speed search.

If the high-speed search processor 330 receives a high-speed search command from a user, the high-speed search processor 330 performs a high-speed search operation. The high-speed search command received through the user interface 280 includes an identifier of a reproduction program, a speed value, etc.

If the high-speed search processor 330 receives such a high-speed search command, the high-speed search processor 330 initializes and drives the storage unit 210, the media interface 220, the stream decoder 230, the video decoder 240, the display controller 260, the display unit 270 and the screen storage unit 290 for high-speed reproduction. Programs stored in the storage unit 210 are input to the stream decoder 230 via the media interface 220 under the control of the high-speed search processor 330. The stream decoder 230 decodes the input streams and transmits the decoded result as a video ES to the video decoder 250. The video decoder 250 decodes the video ES and transmits the decoded results (pictures) to the display controller 260. The display controller 260 extracts representative pictures of the pictures received from the video decoder 250 at a speed selected by the user and outputs the extracted representative pictures to the display unit 270. Also, the display controller 260 reduces the sizes of the representative pictures in a predetermined proportion and transmits the size reduced pictures to the picture storage unit 290 to store the representative pictures therein. Reducing the sizes of the pictures in the predetermined proportion can be carried out by a separate component. Here, the predetermined proportion is decided on the basis of values stored in the high-speed search information register 360.

If the reproduction selection processor (multiple screen image guide) 340 receives a reproduction selection command from a user, the reproduction selection processor 340 performs operations related to a reproduction selection process.

If the reproduction selection processor 340 receives a command like "reproduction selection after high-speed search" through the user interface 280 and the user command interpreter 310, the reproduction selection processor 340 initializes the storage unit 210, the media interface 220, the stream decoder 230, the video decoder 250, the display controller 260, etc., and then drives the display unit 270, the display controller 260 and the picture storage unit 290.

Under the control of the reproduction selection processor 340, the display controller 260 obtains a predetermined number of pictures selected by a user from the pictures stored in the picture storage unit 290 and displays the pictures on a predetermined number of screens selected by the user. At this time, the size of a picture can be adjusted according to the number of pictures to be shown on a screen.

If the reproduction processor 350 receives a command for selecting one of pictures displayed on multiple image screens from a user, the reproduction processor 350 performs operations related to reproduction. That is, if the user selects one of a plurality of pictures displayed on the display unit 270 as a picture corresponding to a reproduction start time (if the user inputs a reproduction command), the reproduction command is transferred to the reproduction processor 350 through the user interface 280 and the user command interpreter 310.

The reproduction processor 350 initializes and drives the storage unit 210, the media interface 220, the stream decoder 230, the video decoder 250 and the display controller 260. Under the control of the reproduction processor 350, the display controller 260 sequentially provides following pictures starting from the picture corresponding to the reproduction start time to the display unit 270, so that the pictures are sequentially displayed on the screen of the display unit 270 according to a frame ratio. If a stream is transmitted to the stream decoder 230 through the media interface 220 after a predetermined time elapses, the stream decoder 230 decodes the stream and transmits the decoded stream as a video ES to the video decoder 250. The video decoder 250 decodes the video ES and transmits the decoded video ES as a decoded picture to the display controller 260 so that the decoded picture is displayed on the display unit 270.

Figure 4:
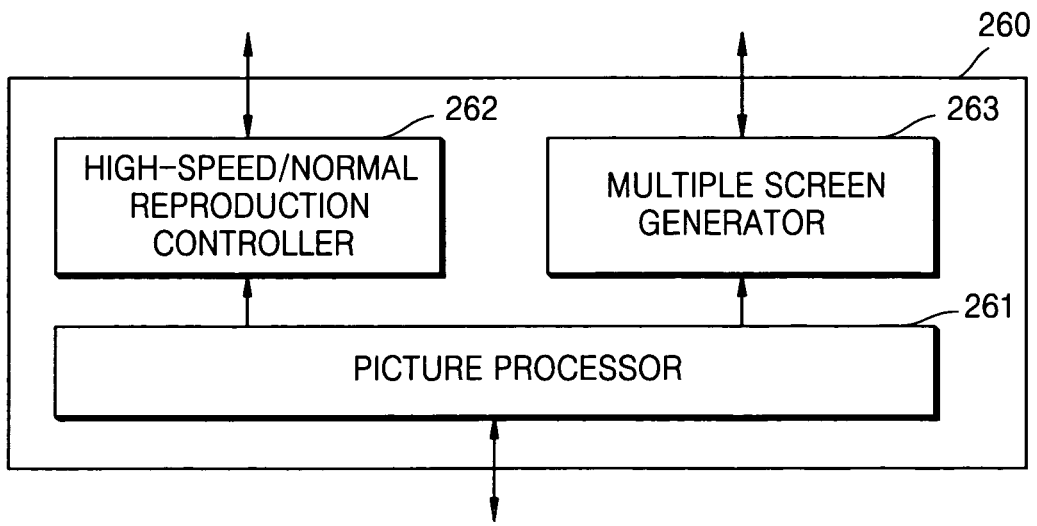
FIG. 4 is a block diagram of the display controller shown in FIG. 2.

FIG. 4 is a block diagram of the display controller 260 shown in FIG. 2.

Referring to FIG. 4, the display controller 260 includes a picture processor 261, a high-speed/normal reproduction controller 262, and a multiple image screen generator 263.

The picture processor 261 receives the decoded picture from the video decoder 250, reduces the size of the decoded picture in a predetermined proportion and provides the size reduced picture to the picture storage unit 290 to store the decoded picture therein. In a normal reproduction, the picture processor 261 receives the decoded picture from the video decoder 250, adjusts the size of the decoded picture according to a frame ratio of the display unit 270, and then provides the resultant picture to the display unit 270.

The high-speed/normal reproduction controller 262 reproduces the picture data provided from the picture processor 261 at a high speed or displays the picture data normally, according to a user command.

The multiple image screen generator 263 constructs a multiple image screen to show a plurality of pictures on a screen when the user inputs a reproduction selection command during high-speed search. Also, one or more multiple image screens can be provided.

The multiple image screen generator 263 receives pictures with small sizes stored in the picture storage unit 290, constructs a multiple image screen and provides the multiple image screen to the display unit 270. The size of each picture included in the multiple image screen can be adjusted according to the number of pictures to be shown on a screen. If a large number of pictures should be shown on a screen, it is possible to hierarchically construct the pictures to a tree structure by allocating an upper-layer index or a lower-layer index to each picture. In detail, pictures with upper-layer indexes are first displayed (the pictures with the upper-layer indexes are representative pictures of pictures with lower-layer indexes), and if the user selects one of the displayed pictures, pictures with lower-layer indexes corresponding to the selected picture are displayed on the display unit 270. As such, by displaying pictures provided between a representative picture and a previous representative picture on a multiple image screen, the user can more exactly select a desired picture.

Figure 6:
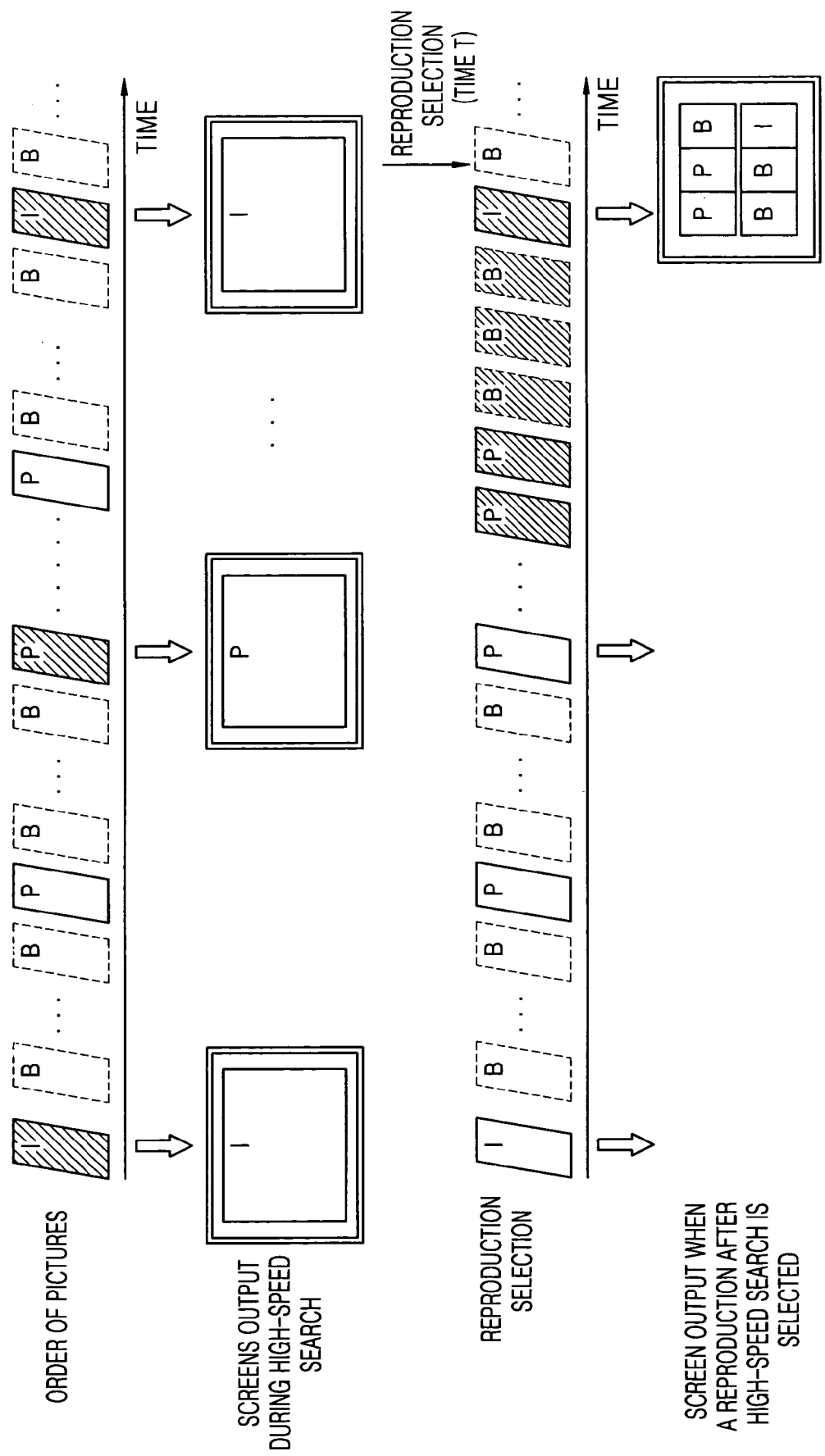
FIG. 6 is a schematic representation of a picture search method according to an embodiment of the present invention.

FIG. 6 is a schematic representation of a picture search method according to an embodiment of the present invention. In more detail, FIG. 6 shows an exemplary screen output when the picture search method is performed.

Referring to FIG. 6, pictures output from the storage unit 210 through the media interface 220 and decoded by the stream decoder 230 and the video decoder 250, appear in an order of I, B, . . . , B, P, B, . . . , B, P, . . . , P, B, . . . , B, I, B over time.

If a high-speed search is performed when the pictures are output in the above order, predetermined representative pictures among the pictures are displayed on the display unit 270 according to a predetermined reproduction speed. Referring to FIG. 6, output pictures are pictures I, P, and I.

In this state, if a user selects a picture corresponding to a reproduction start time through interfacing such as pressing a button at a time T, the display unit 270 displays pictures included in the time interval between the reproduction start time (T) and a predetermined previous time. Referring to FIG. 6, 6 pictures of P, P, B, B, B, and I are displayed on a screen of the display unit 270. A predetermined number of continuous pictures provided before the reproduction start time T can be displayed, as shown in FIG. 6, however, a predetermined number of discontinuous pictures can also be displayed.

A predetermined number of pictures among the pictures included in the time interval between the reproduction start time (T) and the predetermined previous time can be displayed on a screen of the display unit 270. For example, a picture is selected and displayed on the screen for each three pictures of the predetermined number of pictures provided before the reproduction start time T. As such, intermittently displaying pictures is effective when a user has a high probability of failing to exactly select a desired reproduction start time due to a high reproduction speed at which screens are displayed fast.

Figure 7:
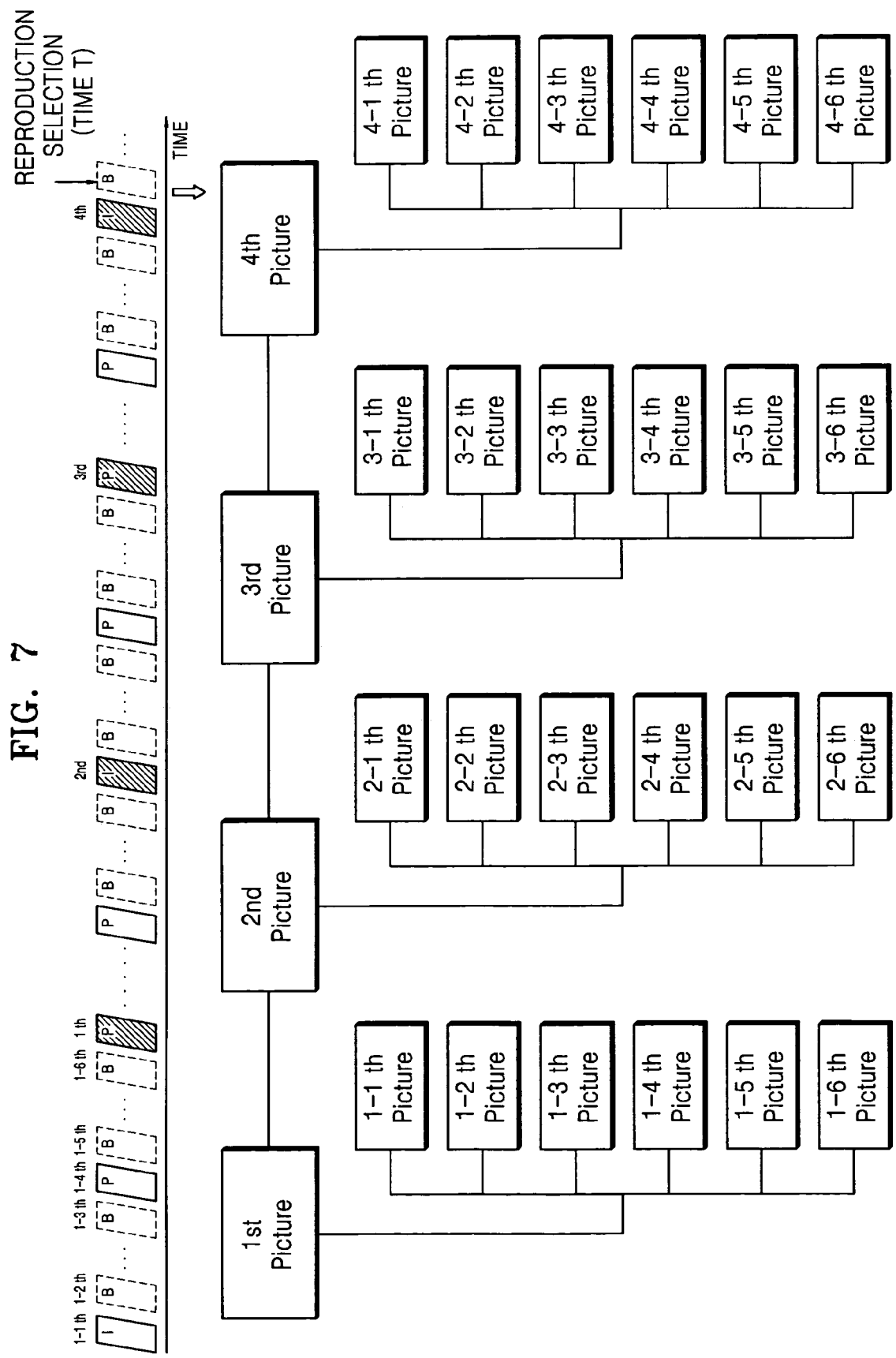
FIG. 7 is a schematic representation of exemplary hierarchical multiple image screens according to an embodiment of the present invention.

FIG. 7 is a schematic representation of exemplary hierarchical multiple image screens according to an embodiment of the present invention.

The hierarchical multiple image screens are created by hierarchically constructing screens to be shown to a user when the user inputs a reproduction command. For example, pictures at longer time intervals between each other are displayed on a first screen and if a user selects one of the pictures on the first screen, adjacent pictures of the selected picture are displayed on the following screen. Such a hierarchical construction allows the user to more exactly select a picture corresponding to a desired reproduction start time even during high-speed search.

Referring to FIG. 7, 4 pictures of 1st, 2nd, 3rd, and 4th pictures included in the time interval between a reproduction start time T and a predetermined previous time are constructed to a first layer, and the previous 6 pictures of the 1st picture, the previous 6 pictures of the 2nd picture, the previous 6 pictures of the 3rd picture, and the previous 6 pictures of the 4th picture are constructed to second layers.

Figure 8:
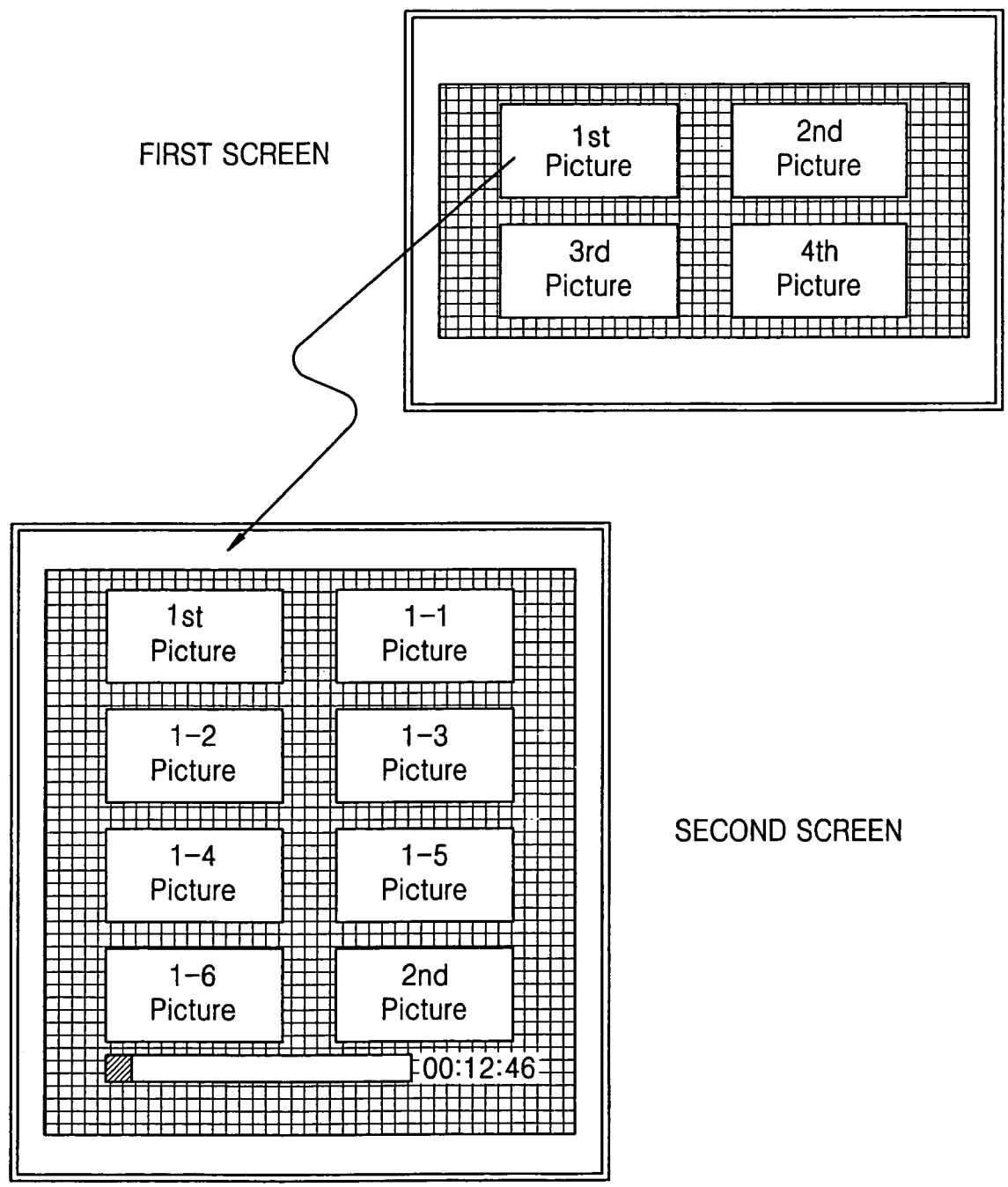
FIG. 8 is a schematic representation in which the hierarchical multiple image screens of FIG. 7 are displayed on a display unit.

The 1st, 2nd, 3rd, and 4th pictures are displayed on a first screen and if the user selects one of the four pictures, lower-layer pictures of the selected picture are displayed on the following screen. FIG. 8 shows a case where the user selects the 1st picture.

FIG. 8 is a schematic representation in which the hierarchical multiple image screens of FIG. 7 are displayed on the display unit 270.

Referring to FIG. 8, the 1st, 2nd, 3rd and 4th pictures are displayed on the first screen of the multiple image screens and if the user selects the 1st picture among the four pictures, the 1st picture, a (1-1)-th picture, a (1-2)-th picture, a (1-3)-th picture, a (1-4)-th picture, a (1-5)-th picture, a (1-6)-th picture and the 2nd picture are displayed on the following second screen. The (1-1)-th, (1-2)-th, (1-3)-th, (1-4)-th, (1-5)-th and (1-6)-th pictures are the lower-layer pictures of the 1st picture, and the 2nd picture can be displayed for a next selection. To select a different picture, a list of pictures included in the first layer can be located in a portion of the multiple image screen.

Figure 9A:
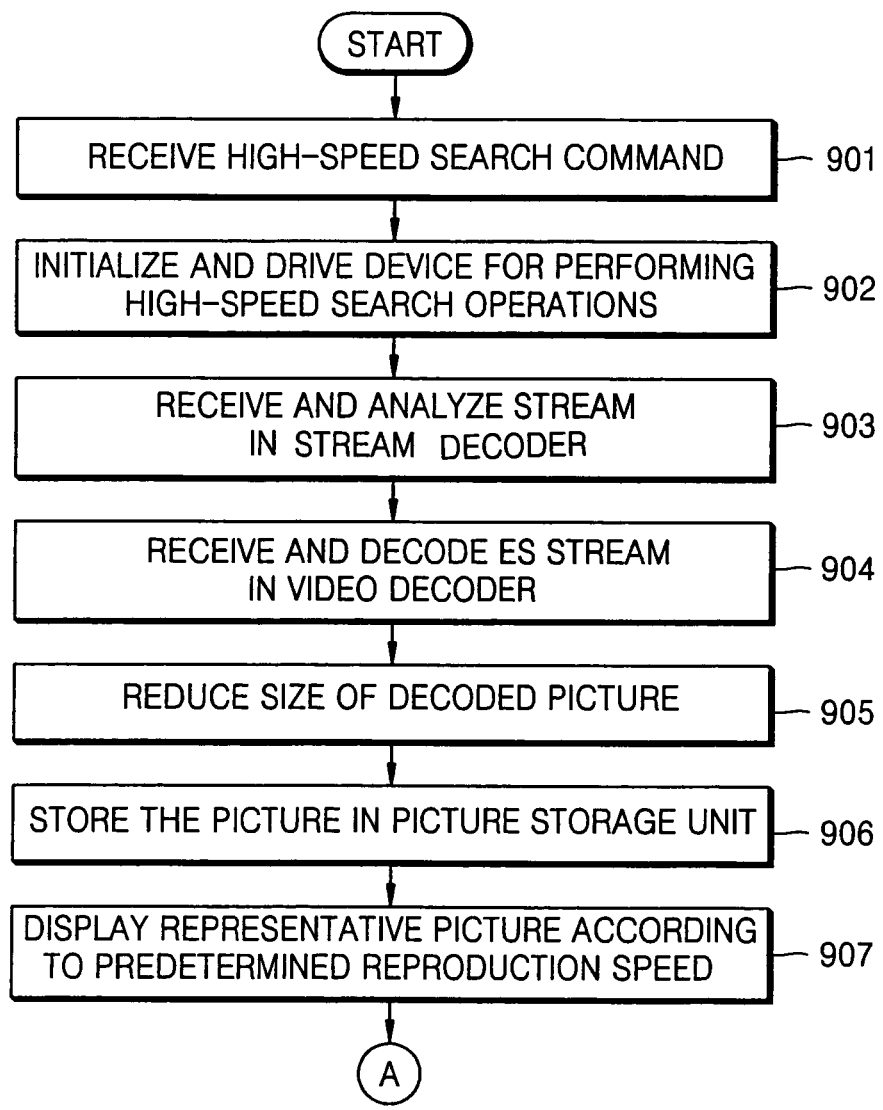
FIGS. 9a and 9b are a flowchart illustrating a picture search method according to an embodiment of the present invention.
Figure 9B:
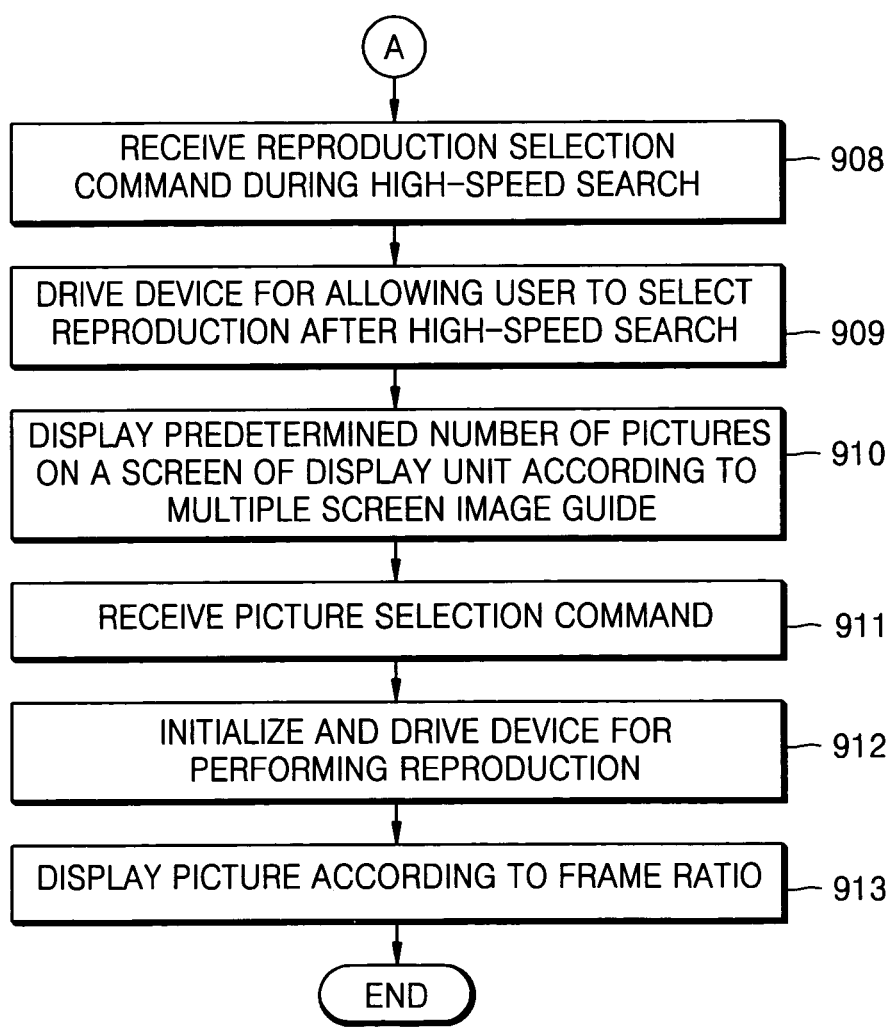

FIGS. 9a and 9b are a flowchart illustrating a picture search method according to an embodiment of the present invention.

Referring to FIG. 9a, if the high-speed search processor 330 receives a high-speed search command through the user interface 280 (operation 901), the high-speed search processor 330 initializes and drives devices related to high-speed search operations (operation 902). Under the control of the high-speed search processor 330, the stream decoder 230 receives and decodes a stream (operation 903) and outputs the decoded result as an ES stream to the video decoder 250. The video decoder 250 receives the ES stream from the stream decoder 230 and decodes the ES stream, then transfers the decoded result (picture) to the display controller 260 (operation 904), and the display controller 260 reduces the size of the decoded picture (operation 905) in a predetermined proportion. Then, the size reduced picture is stored in the picture storage unit 290 (operation 906).

Then, the display unit 270 receives representative pictures by the number of pictures corresponding to a predetermined reproduction speed from the display controller 260 and displays the received representative pictures (operation 907). That is, the display controller 260 provides a decoded picture received from the video decoder 250 to the display unit 270 for each frame so that the decoded picture is displayed on the display unit 270 at a predetermined reproduction speed. Also, the display controller 260 reduces the size of the picture in a predetermined proportion and stores the size reduced picture in the picture storage unit 290. To allow a multiple image screen (multiple screens) to be displayed on the display unit 270 whenever the user inputs a reproduction selection command, the picture storage unit 290 should store all pictures with small sizes in a multiple image screen or a plurality of multiple image screens per each unit time. To store the pictures with the small sizes in the screen storage unit 290, a FIFO (First In First Out) order may be used.

During a high-speed search, if the reproduction selection processor 340 receives a reproduction selection command through the user interface 280 (operation 908), the reproduction selection processor 340 initializes and drives a device to allow a user to select a reproduction after the high-speed search (operation 909). Then, the display controller 260 constructs a multiple image screen using the pictures with the small sizes stored in the picture storage unit 290 and controls the display unit 270 to display the multiple image screen (operation 910).

If a user selects a picture corresponding to a desired reproduction start time while seeing the multiple image screen displayed on the display unit 270 (if the user inputs a selection command), the reproduction processor 350 receives the selection command through the user interface 280 (operation 911) and initializes and drives a device for performing reproduction operations (operation 912). Then, the reproduction processor 350 controls such that the selected picture is displayed on the display unit 270 according to a frame ratio (operation 913).

As described above, the high-speed search control method of an embodiment of the present invention can also be embodied as a computer readable code on a computer readable recording medium. The computer readable recording medium may be any data storage device that can store data which can be thereafter read by a computer system. Examples of a computer readable recording medium include read-only memory (ROM), random-access memory (RAM), CD-ROMs, magnetic tapes, floppy disks, optical data storage devices, and carrier waves. The computer readable recording medium can also be distributed over network coupled computer systems so that the computer readable code is stored and executed in a distributed fashion. Also, functional programs, codes, and code segments for implementing the high-speed search control method are well known to programmers in the art.

As described above, according to an embodiment of the present invention, it is possible to allow a user to exactly select a desired reproduction start time during a high-speed search.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A picture search method for a digital reproduction of a moving image, the method comprising:

receiving, by an apparatus, a reproduction selection command, which is for selecting a normal reproduction time of the moving image, during a high-speed search of the moving image;

in response to the reproduction selection command received during the high-speed search of the moving image, generating, by the apparatus, a multiple image screen by configuring a plurality of pictures of the moving image included in an interval between a predetermined previous time before receiving the reproduction selection command and a time when the reproduction selection command was received;

outputting, to a display unit, the multiple image screen; and sequentially reproducing, by the apparatus, consecutive pictures of the moving image starting from a picture selected by the user among the plurality of pictures included in the multiple image screen, wherein the generating of the multiple image screen comprises hierarchically constructing the multiple image screen by including pictures at longer time intervals between one another in an upper layer and including adjacent pictures of each picture included in the upper layer in a lower layer, wherein the outputting of the multiple image screen comprises:

outputting the pictures included in the upper layer and outputting pictures included in a lower layer of a picture selected by the user among the output pictures included in the upper layer.

2. The method of claim 1, wherein the generating of the multiple image screen comprises reducing sizes of the plurality of pictures and arranging the size reduced pictures on the multiple image screen.

3. The method of claim 1, wherein the high-speed search comprises a high-speed forward search or a high-speed reverse search.

4. The method of claim 1, further comprising:

storing setting information, which is used to generate the multiple image screen, including at least one of information for the number of multiple image screens, information for the number of pictures included in a multiple image screen and information as to whether or not to hierarchically construct the multiple image screen.

5. A reproduction method comprising:

receiving, by an apparatus, a reproduction selection command, which is for selecting a picture corresponding to a reproduction time of a video stream, during a high-speed search of the video stream;

in response to the reproduction selection command received during the high-speed search of the video stream, generating, by the apparatus, a plurality of reference images of the video stream, included in an interval between a predetermined previous time before receiving the reproduction selection command and a time when the reproduction selection command was received;

displaying, to a display unit, the plurality of reference images; and sequentially reproducing, by the apparatus, consecutive reference images of the video stream starting from a reference image selected by the user among the plurality of reference images of the video stream, wherein the generating of the plurality of reference images comprises hierarchically constructing the reference images by including pictures at longer time intervals between one another in a primary layer and including adjacent pictures of each reference image included in the primary layer in a secondary layer, wherein the displaying of the plurality of reference images comprises:

displaying the reference images included in the primary layer and displaying pictures included in the secondary layer of a reference image selected by the user among the displayed reference images in the primary layer.

6. A picture search apparatus for digital reproduction, comprising:

a user command interpreter receives reproduction selection command, which is for selecting a picture corresponding to a reproduction time of a video stream, during a high-speed search of the video stream;

a multiple image screen generator generating a multiple image screen by configuring a plurality of pictures of the moving image, included in an interval between a predetermined previous time before receiving the reproduction selection command and a time when the reproduction selection command was received, in response to the reproduction selection command received during the high-speed search of the video stream, and outputting the multiple image screen to a display unit; and a reproduction controller operating to sequentially reproduce following pictures starting from a picture selected by the user among the plurality of pictures included in the multiple image screen output to the display unit, wherein the multiple image screen generator hierarchically configures the multiple image screen by including pictures with longer time intervals between each other in an upper layer and including adjacent pictures of each picture included in the upper layer in a lower layer, wherein the multiple image screen generator first outputs the pictures included in the upper layer and outputs pictures included in a lower layer of a picture selected by the user among the output pictures.

7. The apparatus of claim 6, wherein the multiple image screen generator reduces sizes of the plurality of pictures and arranges the size reduced pictures on the multiple image screen.

8. The apparatus of claim 6, wherein the high-speed search includes high-speed forward search and high-speed reverse search.

9. The apparatus of claim 6, further comprising a high-speed search information setting unit for storing setting information, which is used to generate the multiple image screen, including information for the number of multiple image screens, information for the number of pictures included in a multiple image screen, and information as to whether or not to hierarchically construct the multiple image screen.

* * * * *